(12) United States Patent
Shoshani et al.

(10) Patent No.: US 12,130,758 B2
(45) Date of Patent: Oct. 29, 2024

(54) DATA TRANSMISSION POWER OPTIMIZATION

(71) Applicant: QUALCOMM Incorporated, San Diego, CA (US)

(72) Inventors: Tomer Shoshani, Tel-Aviv (IL); Albert Yosher, Tel Mond (IL); Yaron Shachar, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/821,935

(22) Filed: Aug. 24, 2022

(65) Prior Publication Data

US 2024/0070095 A1    Feb. 29, 2024

(51) Int. Cl.
| G06F 13/16 | (2006.01) |
|---|---|
| G06F 13/38 | (2006.01) |
| G06F 13/40 | (2006.01) |
| G06F 13/42 | (2006.01) |

(52) U.S. Cl.
CPC ...... *G06F 13/1689* (2013.01); *G06F 13/4068* (2013.01)

(58) Field of Classification Search
CPC .................................. G06F 13/16; G06F 13/40
USPC ......................................................... 710/106
See application file for complete search history.

(56) References Cited

U.S. PATENT DOCUMENTS

| 5,905,725 | A  * | 5/1999  | Sindhu ................... H04L 49/608 370/395.72 |
|---|---|---|---|
| 7,197,032 | B1 * | 3/2007  | Gammenthaler, Jr. ...................... H04L 49/15 370/386 |
| 9,658,951 | B1 * | 5/2017  | Shumsky ............. G06F 12/0223 |
| 2004/0203543 | A1 * | 10/2004 | Regev .................. H04B 1/0458 455/574 |
| 2006/0181949 | A1 * | 8/2006  | Kini ....................... G06F 1/3225 365/230.03 |
| 2007/0067531 | A1 * | 3/2007  | Kolinummi ........... G06F 13/372 710/111 |
| 2009/0245245 | A1   | 10/2009 | Malwankar et al. |
| 2018/0278523 | A1 * | 9/2018  | Ong ........................ H04L 45/60 |
| 2019/0044553 | A1   | 2/2019  | Bunce et al. |
| 2020/0382208 | A1 * | 12/2020 | Hormis ................. H04B 7/2041 |

OTHER PUBLICATIONS

International Search Report and Written Opinion for International Patent Application No. PCT/US2023/070721, mailed Nov. 7, 2023, 15 pages.
Pic Express: "PCI Express Base Specification Revision 3.0", Introduction and Physical Layer Specification, Nov. 10, 2010, pp. 37-412, XP055096393, Section 4.2.1.1.1, Figure 4-4.

\* cited by examiner

*Primary Examiner* — Chun Kuan Lee (74) *Attorney, Agent, or Firm* — W&T/Qualcomm (57) ABSTRACT

Systems and methods for data transmission power optimization are disclosed. In one aspect, the system consolidates signals from multiple narrowband channels in a radio frequency (RF) integrated circuit (IC) (RFIC) into a single shared buffer and evenly distributes packets based on the signals across lanes in a communication bus to a modem circuit. Such even utilization of the lanes of the bus allows for idle periods to occur on the bus, during which a low power or sleep state may be used to reduce power consumption.

12 Claims, 8 Drawing Sheets

DATA TRANSMISSION POWER OPTIMIZATION

BACKGROUND

I. Field of the Disclosure

The technology of the disclosure relates generally to a communication bus and, more particularly, to ways to optimize power consumption by the communication bus.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to reduce power consumption. One way that power consumption has been reduced is to put circuits and communication links to sleep or change the duty cycle of the communication links. Reducing the duty cycle of the communication links creates its own challenges.

SUMMARY

Aspects disclosed in the detailed description include systems and methods for data transmission power optimization. More specifically, exemplary aspects of the present disclosure consolidate signals from multiple narrowband channels in a radio frequency (RF) integrated circuit (IC) (RFIC) into a single shared buffer and evenly distribute packets based on the signals across lanes in a communication bus to a modem circuit. Such even utilization of the lanes of the bus allows for idle periods to occur on the bus, during which a low-power or sleep state may be used to reduce power consumption.

In this regard, in one aspect, an IC is disclosed. The IC includes a bus interface configured to be coupled to a plurality of lanes in a communication bus. The IC also includes a memory structure comprising a plurality of memory banks. The memory structure is configured to receive a first package from a channel, partition the first packet into a plurality of units equal in number to the plurality of memory banks, and store the plurality of units into corresponding ones of the plurality of memory banks. The IC also includes a multiplexer associated with the memory structure and the bus interface. The multiplexer is configured to reassemble the first packet from the plurality of memory banks and route the first packet to a lane in the communication bus through the bus interface.

In another aspect, an IC is disclosed. The IC includes a bus interface configured to be coupled to a plurality of lanes in a communication bus. The IC also includes a crossbar coupled to the bus interface. The crossbar is configured to receive a first packet from a first lane, read a channel identifier in the first packet, and route to a first memory the first packet based on the channel identifier.

In another aspect, a method of saving power is disclosed. The method includes aggregating packets from a plurality of channels into a shared memory structure. The method also includes draining the packets from the shared memory structure onto lanes of a communication bus. The method also includes, when the shared memory structure is drained, putting the communication bus to sleep.

In another aspect, a computing device is disclosed. The computing device includes a communication bus comprising a plurality of lanes. The computing device also includes a radio frequency (RF) IC (RFIC). The RFIC includes a first bus interface coupled to the communication bus and a memory structure comprising a plurality of memory banks. The memory structure is configured to receive a first packet from a channel, partition the first packet into a plurality of units equal in number to the plurality of memory banks, and store the plurality of units into corresponding ones of the plurality of memory banks. The RFIC also includes a multiplexer associated with the memory structure and the first bus interface. The multiplexer is configured to reassemble the first packet from the plurality of memory banks and route the first packet to a lane. The computing device also includes a modem IC. The modem IC includes a second bus interface coupled to the communication bus and a crossbar configured to route incoming packets from the communication bus to memories for further processing.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include systems and methods for data transmission power optimization. More specifically, exemplary aspects of the present disclosure consolidate signals from multiple narrowband channels in a radio frequency (RF) integrated circuit (IC) (RFIC) into a single shared buffer and evenly distribute packets based on the signals across lanes in a communication bus to a modem circuit. Such even utilization of the lanes of the bus allows for idle periods to occur on the bus, during which a low-power or sleep state may be used to reduce power consumption.

Figure 1:
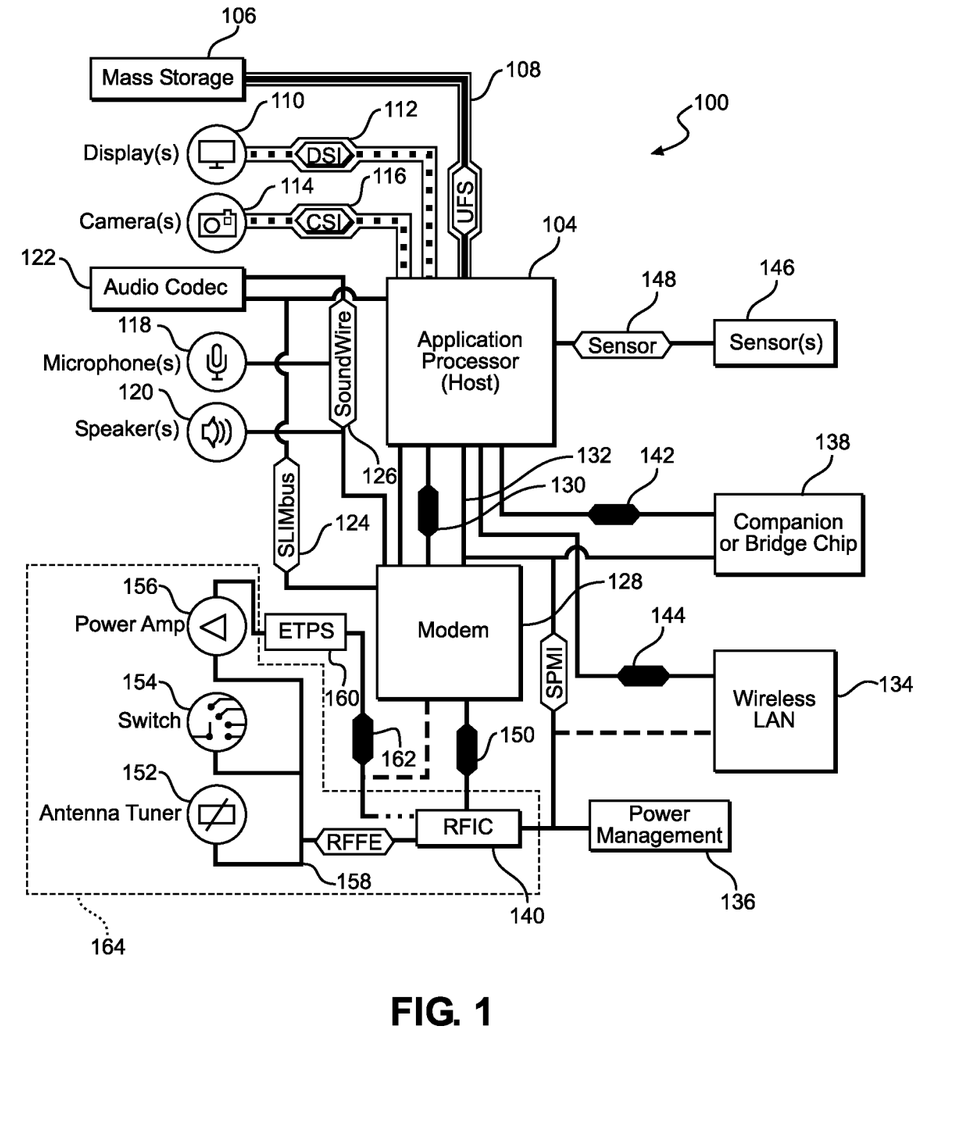
FIG. 1 is a block diagram of an exemplary mobile communication device that may include a radio frequency (RF) integrated circuit (IC) (RFIC) and a modem circuit.
Figure 2:
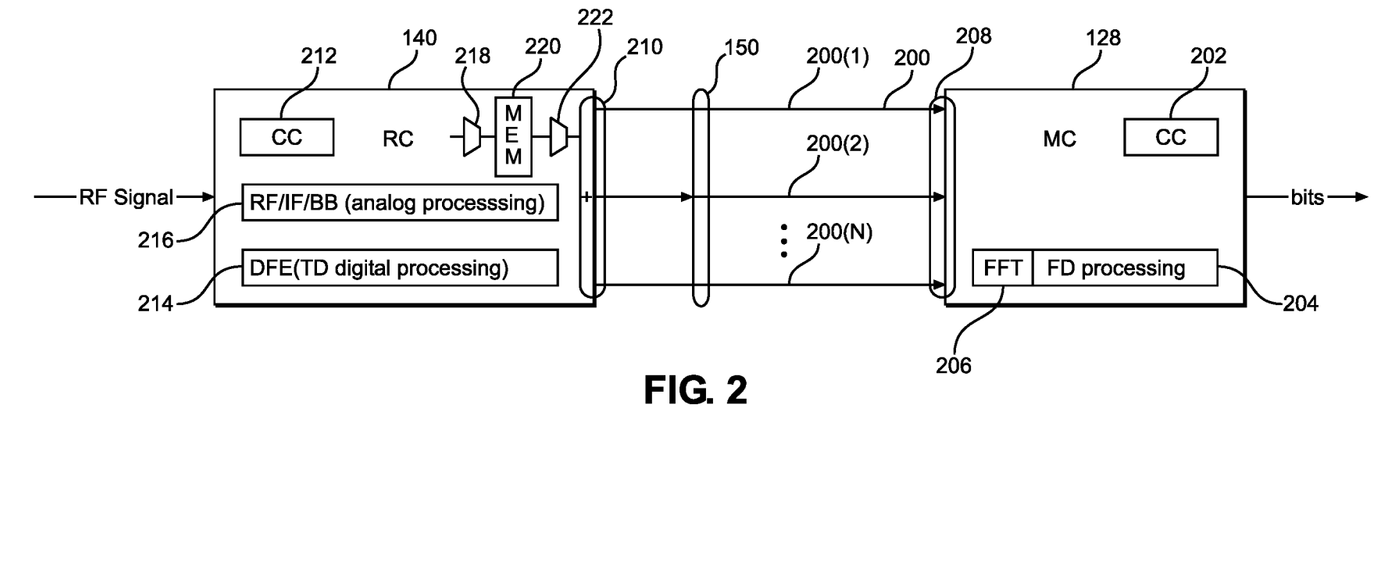
FIG. 2 is a block diagram showing more detail about the RFIC-modem circuit link.

Before addressing particular aspects of the present disclosure, a brief overview of the context of systems that use exemplary aspects of the present disclosure is provided with reference to FIGS. 1 and 2, along with a further discussion of poor power optimization that may be found in conventional systems. A discussion of details of the present disclosure begins below with reference to FIG. 3.

In this regard, FIG. 1 is a system-level block diagram of an exemplary mobile terminal 100, such as a smartphone, mobile computing device tablet, or the like. The mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUNDWIRE bus 126. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a local area network (LAN or WLAN) IC (LAN IC or WLAN IC) 134, a power management integrated circuit (PMIC) 136, a companion IC (sometimes referred to as a bridge chip) 138, and an RFIC 140. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150 (sometimes also referred to as a communication bus).

With continued reference to FIG. 1, the RFIC 140 may couple to one or more RFFE elements, such as an antenna tuner 152, a switch 154, and a power amplifier 156 through a radio frequency front end (RFFE) bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated).

There may be multiple channels of communication between the modem 128 and the RFIC 140. These channels are conveyed through physical links or lanes of conductive material (e.g., copper wires). This situation is better illustrated in FIG. 2, where the modem 128 (also named MC in FIG. 2) is coupled to the RFIC 140 (also named RC in FIG. 2) by the bus 150 (also referred to as a means for conveying signals), which is composed of a plurality of lanes 200(1)-200(N) (generically a single lane is lane 200) where each lane 200 is a physical electrical conductor.

With continued reference to FIG. 2, the modem 128 may include a control circuit 202 that works with frequency domain (FD) processing circuitry 204, which may include a fast Fourier transform (FFT) circuit 206 that takes signals in a time domain and transforms them into the frequency domain. The FFT circuit 206 receives signals through a bus interface 208, which is configured to couple to the bus 150.

With continued reference to FIG. 2, the RFIC 140 may be configured to couple to the bus 150 through a bus interface 210. The RFIC 140 may further include a control circuit 212 that works with a digital front end circuit 214, which may include time domain digital processing circuitry, as well as an analog processing circuit 216, which may handle RF, intermediate frequency (IF), and baseband (BB) frequencies (and thus may be referred to as an RF analog processing circuit or RF analog processing circuitry). Note that the precise demarcation of what frequencies are handled in the RFIC 140 relative to the modem 128 is not central to the present disclosure, and the precise nature of the circuits 214 and 216 may vary without departing from the present disclosure. The RFIC 140 may receive an RF signal from an antenna (such as the antenna tuner 152 of FIG. 1). This RF signal may include multiple narrowband channels that will be passed to the modem 128. The signals may be processed by the circuits 214, 216 including assembling the signals into packets such as through an aggregation process (e.g., a certain number of bits of the signal are buffered and then formed into a packet with a header and the bits of the signal as a payload), and then multiplexed by a multiplexer 218 (also referred as a means for multiplexing) into a memory structure 220 (also referred to as a means to store data). The signals are then read out of the memory structure 220 and passed through a second multiplexer 222 to a channel circuit, which may include the bus interface 210 and thus to the lanes 200(1)-200(N), as better explained below.

In the absence of the present disclosure, channels may be assigned to specific lanes on the bus. Lane usage may be uneven based on bandwidth requirements associated with the channels. For example, one channel may use twice the bandwidth as another channel. This difference in bandwidth translates to more packets being sent over one lane compared to another lane. In general, while one lane is active, the entire communication bus is considered active and consumes power. Thus, circuitry associated with idle lanes is still active and consuming power even though no traffic is taking place on the lane. That is, in conventional systems, only when all the lanes are idle can the bus be put into a low-power or sleep mode. This limited low-power option unnecessarily consumes power, which is generally undesirable in a mobile terminal.

Exemplary aspects of the present disclosure consolidate the channels into the memory structure 220 and distribute packets from the memory structure 220 evenly across the lanes 200(1)-200(N) so that despite different channel bandwidths, the lanes 200(1)-200(N) are generally idle at the same time and for the same duration, allowing for more frequent and/or longer sleep or low-power modes for the communication bus 150. It should be appreciated that the memory structure 220 includes an interface such as an input/output (I/O) pin (not shown explicitly and sometimes referred to as a means to receive a packet) or the like that is configured to receive packets from the channels.

Figure 3:
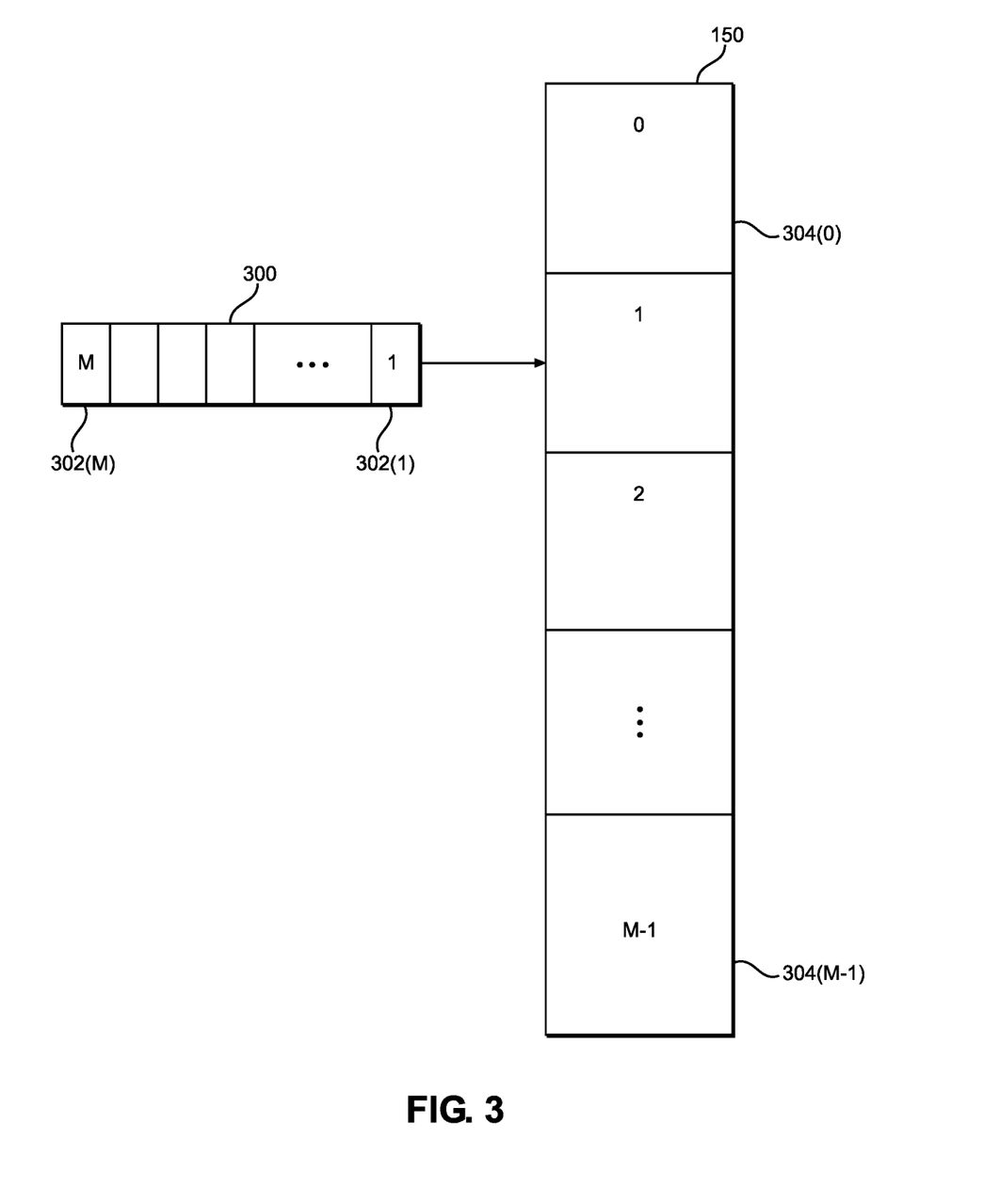
FIG. 3 is a block diagram showing how the RFIC may use a memory structure to divide signal packets according to an exemplary aspect of the present disclosure.

FIG. 3 shows an exemplary technique for loading a packet 300 into the memory structure 220. Specifically, the packet 300 contains a portion of a signal from a channel, which in an exemplary aspect is a narrowband channel. The packet 300 may conceptually be partitioned through a signal divider (not shown explicitly and sometimes referred to as a means to partition) into equally-sized units 302(1)-302(M). Similarly, the memory structure 220 may have M memory banks

304(0)-304(M−1) (also referred to as a means to store the plurality of units 302(1)-302(M)). Each unit 302(1)-302(M) is written into a respective memory bank 304(0)-304(M−1). More accurately, given that there are M memory banks 304(0)-304(M−1), the packet 300 is divided into M units 302(1)-302(M), which are then written into the respective memory banks 304(0)-304(M−1). It should be appreciated that the plurality of memory banks 304(0)-304(M−1) may be considered to be parallel with one another.

Figure 4:
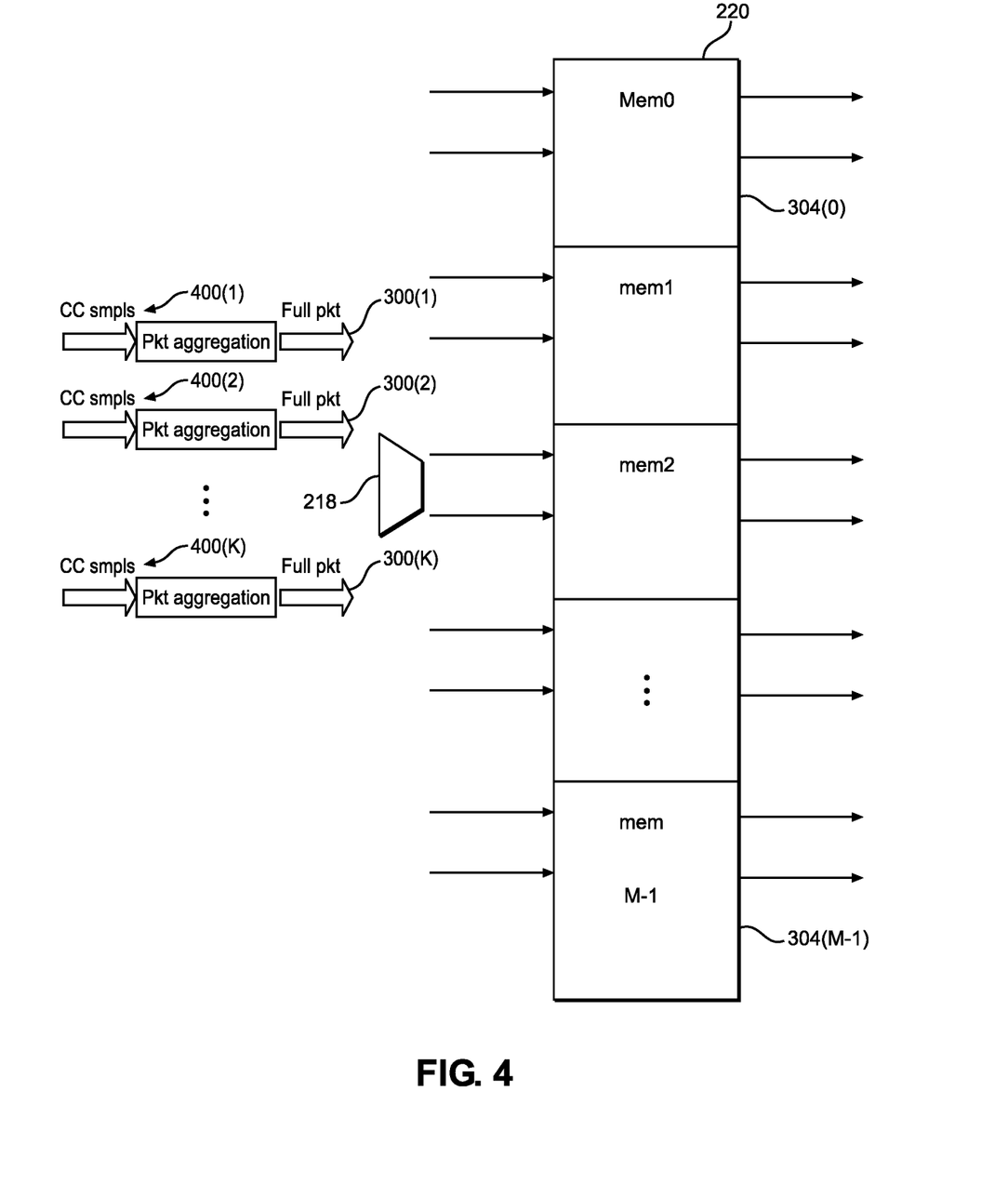
FIG. 4 is a block diagram showing how multiple signal packets may be loaded into the memory structure of FIG. 3.

If there were only a single channel, aspects of the present disclosure would still be of value in spreading signaling over all the lanes, but exemplary aspects of the present disclosure are well suited for operation with consolidation of packets from multiple channels, as better seen in FIG. 4. Specifically, signals within the channels 400(1)-400(K) are processed and aggregated by the circuits 214, 216 to generate respective packets 300(1)-300(K). The multiplexer 218 may aggregate the packets 300(1)-300(K) through an arbitration protocol that is used to arbitrate between channels to select a packet 300 from within the packets 300(1)-300(K) to write into the memory structure 220. As explained above, each of the packets 300(1)-300(K) is partitioned into M units 302(1)-302(M) and written into the memory banks 304(0)-304(M−1). Exemplary arbitration schemes include round robin, weighted based on some quality of service (QoS) requirement, weighted round robin based on bandwidth, or the like.

While not shown in FIG. 4, it should be appreciated that the multiplexer 222 may also include an arbitrator that selects an available lane 200 within the plurality of lanes 200(1)-200(N) over which to send a packet 300 from the memory structure 220. Again, the arbitration may be round robin, weighted round robin, or the like.

Figure 5A:
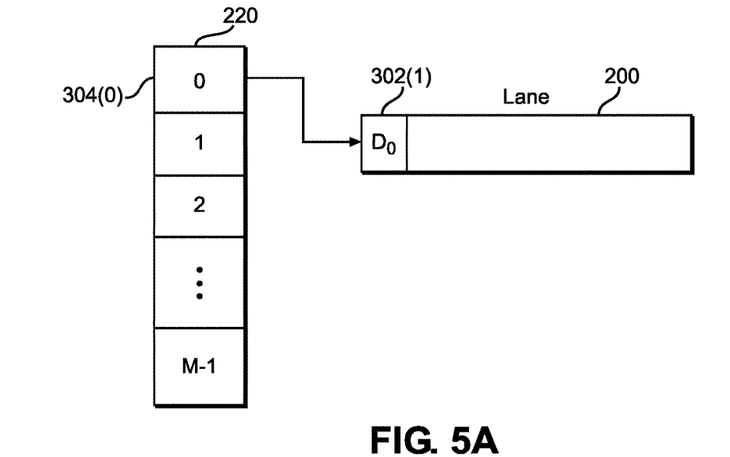
FIGS. 5A-5D provide stylized block diagrams of how a packet may be reassembled coming out of the memory structure and placed on a lane of a communication bus.
Figure 5B:
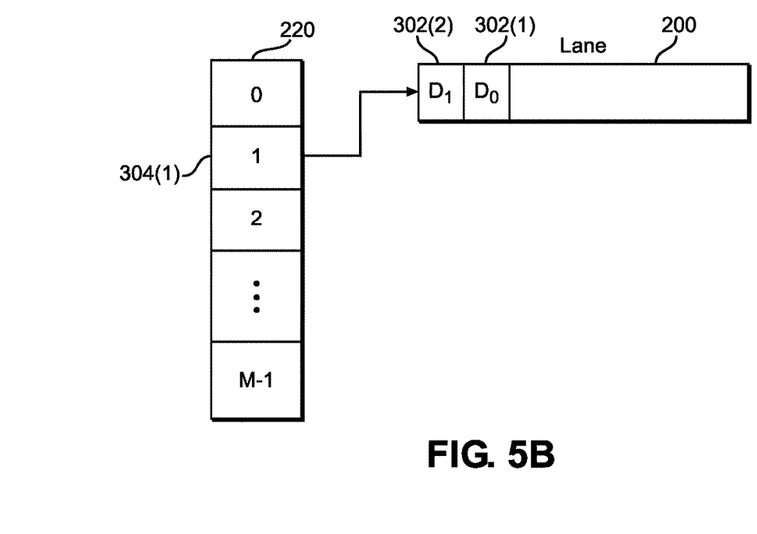
Figure 5C:
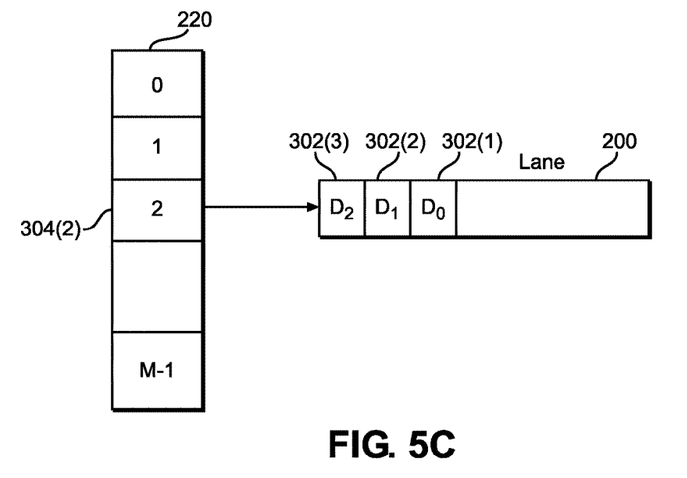
Figure 5D:
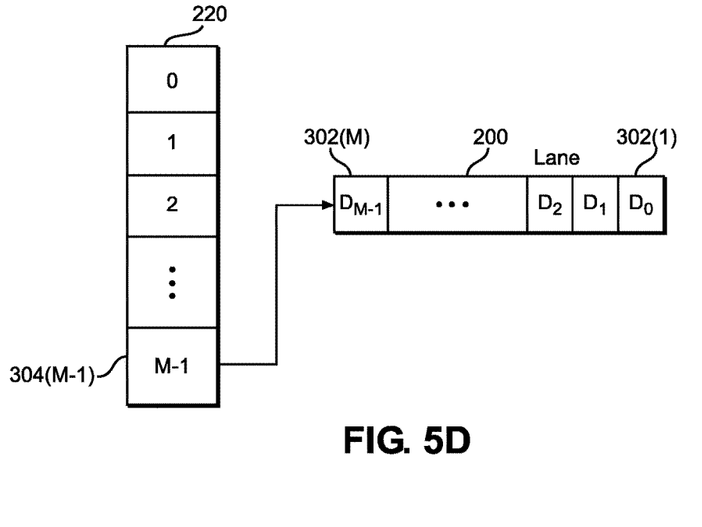

Once the arbitration has selected a lane 200 over which the packet 300 is to be sent, the lane 200 begins pulling the units 302(1)-302(M) from the memory banks 304(0)-304(M−1) of the memory structure 220 as better illustrated in FIGS. 5A-5D. Specifically, a lane 200 has been selected by the arbitration scheme and the first memory bank 304(0) is read such that the unit 302(1) (also $D_0$ in FIGS. 5A-5D) is pulled onto the lane 200 (see FIG. 5A) at a first clock cycle. As used herein, reading this data from the memory banks 304(0)-304(M−1) and pulling the data onto the lane 200 may be referred to as "draining." Such terminology based on analogies to a sink (memory bank) being full of liquid (data) and draining into a single pipe (lane). Optionally, the first memory bank 304(0) may be overwritten immediately after the reading or the memory bank 304(0) may be left unchanged until a subsequent write operation. On a next clock cycle, the lane 200 drains the second memory bank 304(1) (see FIG. 5B) to pull the unit 302(2) (also $D_1$) onto the lane 200. FIG. 5C shows the third memory bank 304(2) being drained onto the lane 200 on the next clock cycle. Thus, the lane 200 steps through the memory banks 304(0)-304(M−1), draining each in turn on sequential clock cycles until, as shown in FIG. 5D, the packet 300 has been reassembled and is sent through the bus 150 to the modem 128.

Figure 6A:
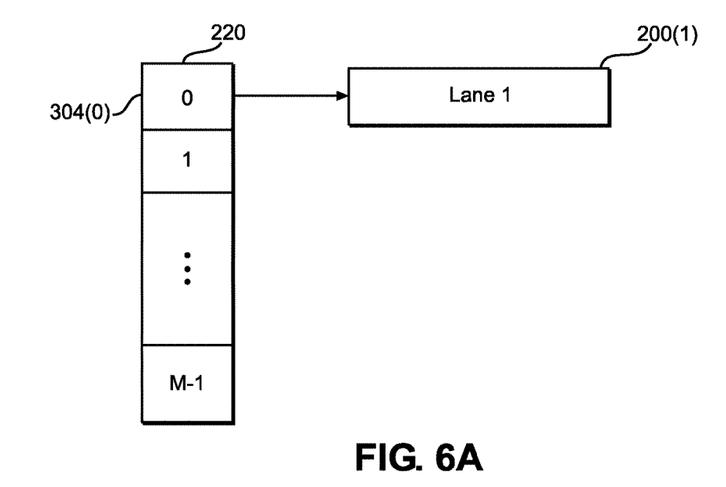
FIGS. 6A-6C provide stylized block diagrams of how multiple packets may be reassembled and placed on differing lanes of the communication bus.
Figure 6B:
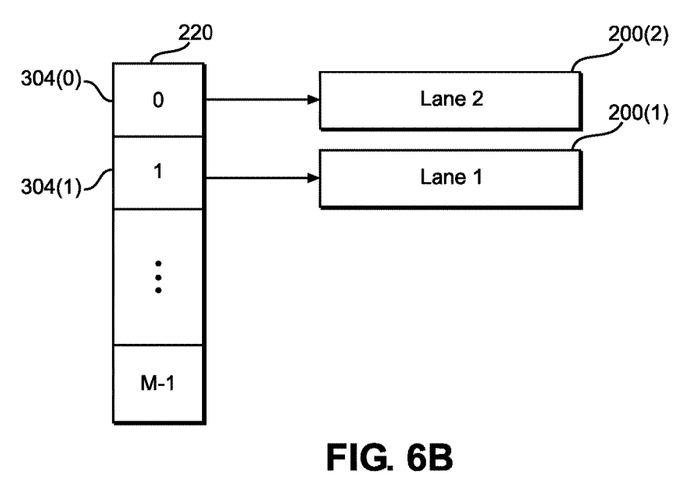
Figure 6C:
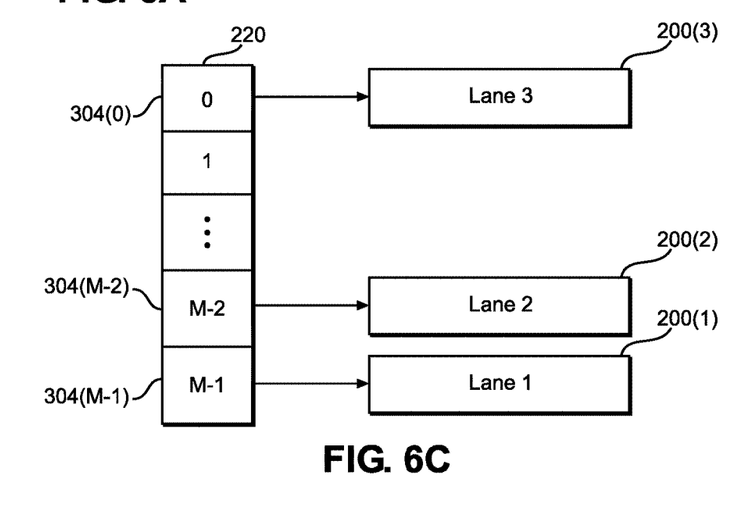

FIGS. 6A-6C show the same concept applied to multiple lanes 200(1)-200(3) operating concurrently to drain the memory structure 220. In FIG. 6A, the lane 200(1) has won arbitration (against lane 200(2)) and begins draining the first memory bank 304(0). At the next clock cycle, lane 200(2) now wins arbitration (having no contesting lanes for the purpose of this example) and drains the first memory bank 304(0), while the first lane 200(1) drains the second memory bank 304(1). These lanes 200(1)-200(2) step through the memory banks 304(0)-304(M−1) of the memory structure 220 until, as shown in FIG. 6C, at some subsequent time (in this case, M−1 clock cycles after lane 200(1) won the first arbitration) another lane 200(3) wins arbitration against another lane 200(X) (not shown) and drains the first memory bank 304(0). Concurrently, lane 200(1) is draining the last memory bank 304(M−1), and lane 200(2) is draining the memory bank 304(M−2). Having completed draining an entire packet, the lane 200(1) is then available to participate in arbitration against lane 200(4) (which, in this example, lost the previous arbitration and is automatically re-entered into the next arbitration). It should be appreciated that the arbitration may include more than two lanes being available.

Figure 7:
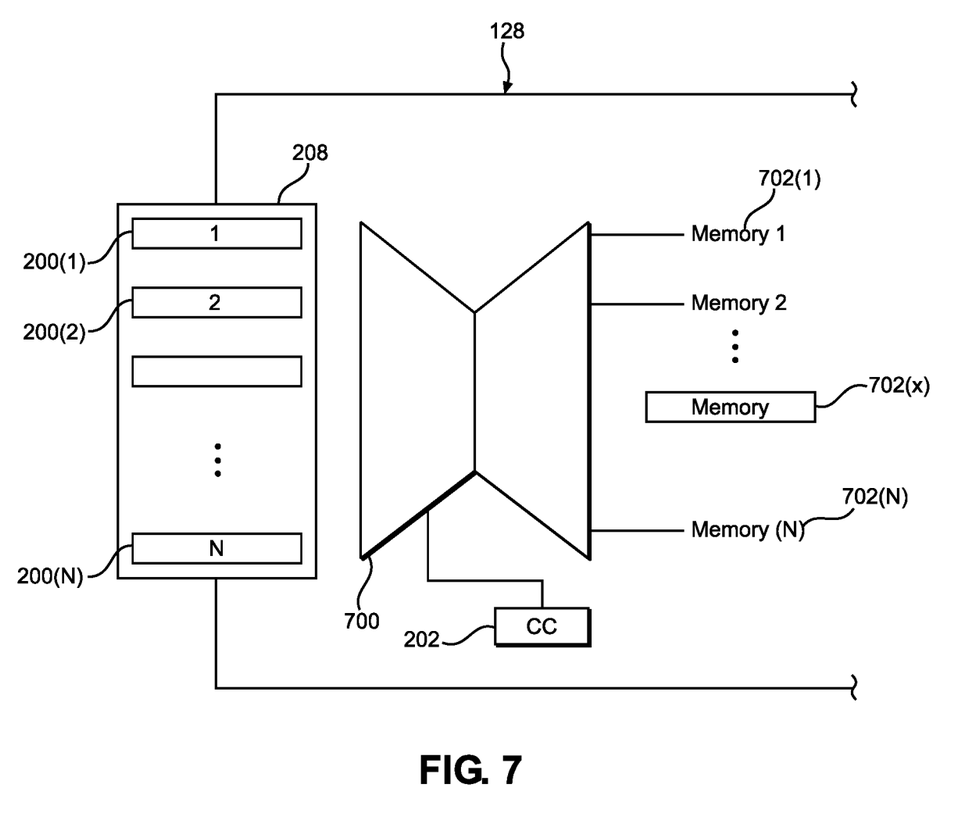
FIG. 7 provides a block diagram of a modem circuit routing reassembled packets from lanes on the communication bus.

FIG. 7 provides additional details about the routing of packets received at the modem 128. The modem receives packets from the lanes 200(1)-200(N) through the bus interface 208, and a crossbar 700 may inspect a channel identifier in the packet to route the packet to a memory bank 702(X) within a plurality of memory banks 702(1)-702(N) corresponding to a particular channel. Note that the channel identifier may be inserted when the packet is written into the memory structure 220. The control circuit 202 may be used to control the crossbar 700.

Figure 8:
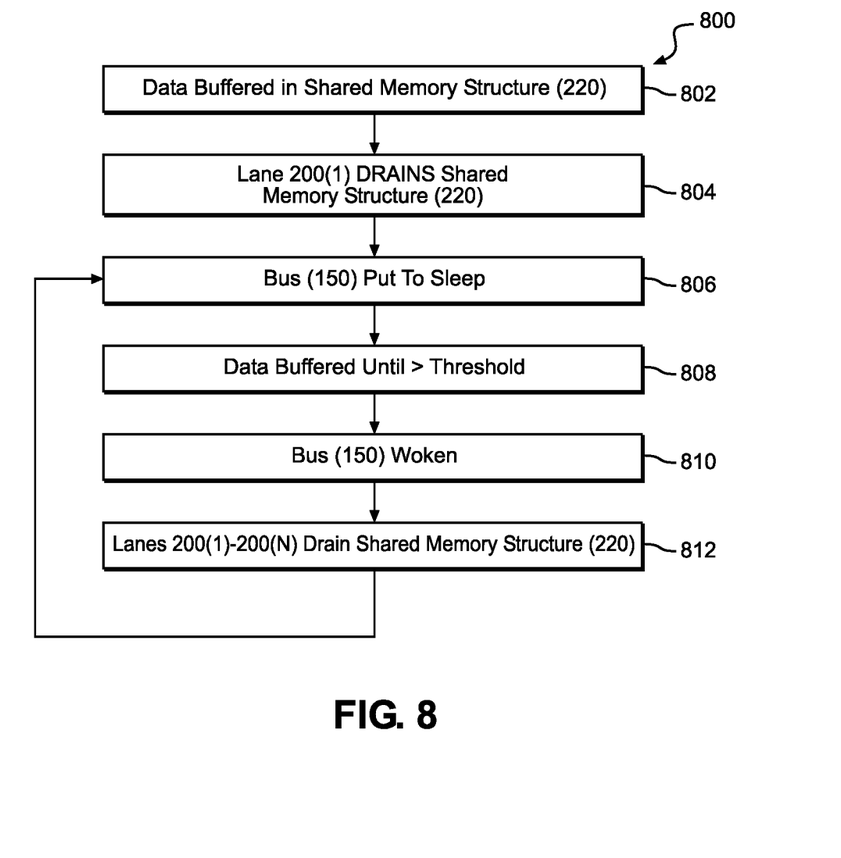
FIG. 8 is a flowchart illustrating an exemplary process for putting the communication bus to sleep when the memory structure is drained.

FIG. 8 provides a flowchart of a process 800 that may be used to put the bus 150 into a low-power or sleep mode. Specifically, the process 800 begins with data or packets being buffered in the shared memory structure 220 (block 802). The lanes 200(1)-200(N) drain the shared memory structure 220 (block 804). When the memory structure 220 is drained, the bus 150 is put to sleep (block 806). Data or packets are buffered in the memory structure 220 until a threshold has been exceeded (block 808) and the bus 150 is woken (block 810). The lanes 200(1)-200(N) drain the shared memory structure 220 (block 812), and the process 800 repeats at block 806.

Those of skill in the art will further appreciate that the various illustrative logical blocks, modules, circuits, and algorithms described in connection with the aspects disclosed herein may be implemented as electronic hardware, instructions stored in memory, or in another computer readable medium wherein any such instructions are executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

Implementation examples are described in the following numbered clauses:

1. An integrated circuit (IC) comprising:
    a bus interface configured to be coupled to a plurality of lanes in a communication bus;
    a memory structure comprising a plurality of memory banks, the memory structure configured to:
       receive a first packet from a channel, and
       partition the first packet into a plurality of units equal in number to the plurality of memory banks; and
       store the plurality of units into corresponding ones of the plurality of memory banks; and
    a multiplexer associated with the memory structure and the bus interface, the multiplexer configured to reassemble the first packet from the plurality of memory banks and route the first packet to a lane in the communication bus through the bus interface.

2. The IC of clause 1, wherein each of the plurality of units is uniformly sized.
3. The IC of clause 1 or 2, wherein the channel comprises a narrowband channel.
4. The IC of any preceding clause, further comprising time domain digital processing circuitry configured to operate on a radio frequency (RF) signal received through an antenna.
5. The IC of any of clauses 1 to 3, further comprising radio frequency (RF) analog processing circuitry configured to operate on an RF signal received through an antenna.
6. The IC of any preceding clause, further comprising a channel circuit configured to output a plurality of channels including the channel; and
    a second multiplexer coupling the channel circuit to the memory structure.
7. The IC of clause 6, wherein the plurality of channels provides a plurality of packets including the first packet to the memory structure.
8. The IC of clause 7, wherein the multiplexer is configured to reassemble each of the plurality of packets and route each of the plurality of packets to the bus interface.
9. The IC of any preceding clause, further comprising an arbitrator configured to assign the first packet to the lane within the plurality of lanes.
10. The IC of any preceding clause, wherein the memory structure is further configured to add a channel identifier to the first packet to identify the channel.
11. The IC of any preceding clause, further comprising a control circuit configured to put the bus interface into a low-power mode when the memory structure is empty.
12. The IC of any preceding clause integrated into a radio frequency (RF) IC (RFIC).
13. An integrated circuit (IC), comprising:
    a bus interface configured to be coupled to a plurality of lanes in a communication bus; and
    a crossbar coupled to the bus interface and configured to:
       receive a first packet from a first lane;
       read a channel identifier in the first packet; and
       route to a first memory the first packet based on the channel identifier.
14. The IC of clause 13 integrated into a modem.
15. The IC of clause 13 or 14, wherein the crossbar is further configured to:
    receive a second packet from a second lane;
    read a second channel identifier in the second packet; and
    determine that the second packet is routed to the first memory.
16. The IC of any of clauses 13 to 15, further comprising a frequency domain processing circuitry configured to operate on the first packet in a frequency domain.
17. The IC of any of clauses 13 to 16, wherein the bus interface is configured to enter a low-power mode when no packets are present on the communication bus.
18. A method of saving power, comprising:
    aggregating packets from a plurality of channels into a shared memory structure;
    draining the packets from the shared memory structure onto lanes of a communication bus; and
    when the shared memory structure is drained, putting the communication bus to sleep.

19. The method of clause 18, further comprising partitioning the packets into corresponding data banks within the shared memory structure.

20. The method of clause 18 or 19, further comprising conducting arbitration between the plurality of channels as the packets are aggregated into the shared memory structure.

21. The method of any of clauses 18 to 20, further comprising conducting arbitration between the lanes of the communication bus as the packets are drained from the shared memory structure.

22. The method of any of clauses 18 to 21, wherein aggregating the packets into the shared memory structure comprises aggregating the packets in a plurality of parallel memory banks.

23. The method of clause 22, wherein aggregating the packets in the plurality of parallel memory banks comprises partitioning a packet into a plurality of units and spreading the plurality of units across the plurality of parallel memory banks.

24. The method of any of clauses 18 to 23, wherein draining the packets onto the lanes of the communication bus comprises draining a first packet onto a single lane of the communication bus.

25. A computing device comprising:
a communication bus comprising a plurality of lanes;
a radio frequency (RF) integrated circuit (IC) (RFIC) comprising:
 a first bus interface coupled to the communication bus;
 a memory structure comprising a plurality of memory banks, the memory structure configured to:
  receive a first packet from a channel;
  partition the first packet into a plurality of units equal in number to the plurality of memory banks; and
  store the plurality of units into corresponding ones of the plurality of memory banks; and
 a multiplexer associated with the memory structure and the first bus interface, the multiplexer configured to reassemble the first packet from the plurality of memory banks and route the first packet to a lane; and
a modem IC comprising:
 a second bus interface coupled to the communication bus; and
 a crossbar configured to route incoming packets from the communication bus to memories for further processing.

26. An integrated circuit (IC) comprising:
a means for conveying signals comprising a plurality of lanes;
a means to store data comprising a plurality of memory banks, the memory structure comprising:
 a means to receive a first packet from a channel;
 a means to partition the first packet into a plurality of units equal in number to the plurality of memory banks; and
 a means to store the plurality of units into corresponding ones of the plurality of memory banks; and
a means for multiplexing associated with the means to store data and the means for conveying signals, the means for multiplexing configured to reassemble the first packet from the plurality of memory banks and route the first packet to a lane in the means for conveying signals.

What is claimed is:

1. An integrated circuit (IC) comprising:
an input configured to receive a radio frequency (RF) signal from an antenna;
an output bus interface configured to be coupled to a plurality of lanes in a communication bus configured to carry signals from the IC to a remote processor;
a memory structure comprising an input/output (I/O) pin and a plurality of memory banks, the memory structure configured to:
 receive a first packet from a channel through the I/O pin,
 partition the first packet into a plurality of units equal in number to the plurality of memory banks; and
 store the plurality of units into corresponding ones of the plurality of memory banks;
an input multiplexer communicatively positioned between the input and the I/O pin; and
an output multiplexer communicatively positioned between the memory structure and the output bus interface while being separate and distinct therefrom, the output multiplexer configured to reassemble the first packet from the plurality of memory banks and route the first packet to a lane in the communication bus through the output bus interface.

2. The IC of claim 1, wherein each of the plurality of units is uniformly sized.

3. The IC of claim 1, wherein the channel comprises a narrowband channel.

4. The IC of claim 1, further comprising time domain digital processing circuitry configured to operate on the RF signal received through the antenna.

5. The IC of claim 1, further comprising RF analog processing circuitry positioned between the input and the input multiplexer, the RF analog processing circuitry configured to operate on the RF signal received from the antenna.

6. The IC of claim 1, wherein the input multiplexer is configured to receive a plurality of channels wherein each of the plurality of channels provides a plurality of packets, one of which is the first packet.

7. The IC of claim 6, wherein the output multiplexer is configured to reassemble each of the plurality of packets and route each of the plurality of packets to the output bus interface.

8. The IC of claim 1, further comprising an arbitrator configured to assign the first packet to the lane within the plurality of lanes.

9. The IC of claim 1, wherein the memory structure is further configured to add a channel identifier to the first packet to identify the channel.

10. The IC of claim 1, further comprising a control circuit configured to put the output bus interface into a low-power mode when the memory structure is empty.

11. The IC of claim 1 integrated into a radio frequency (RF) IC (RFIC).

12. A computing device comprising:
a communication bus comprising a plurality of lanes;
a radio frequency (RF) integrated circuit (IC) (RFIC) comprising:
 an input configured to receive an RF signal from an antenna;
 an output bus interface coupled to the communication bus;

a memory structure comprising an input/output (I/O) pin and a plurality of memory banks, the memory structure configured to:
  receive a first packet from a channel through the I/O pin,
  partition the first packet into a plurality of units equal in number to the plurality of memory banks; and
  store the plurality of units into corresponding ones of the plurality of memory banks;
an input multiplexer communicatively positioned between the input and the I/O pin; and
an output multiplexer communicatively positioned between the memory structure and the output bus interface but separate and distinct from both, the output multiplexer configured to reassemble the first packet from the plurality of memory banks and route the first packet to a lane in the communication bus through the output bus interface; and
a modem IC comprising:
  a second bus interface coupled to the communication bus; and
  a crossbar configured to route incoming packets from the communication bus to memories for further processing.

* * * * *